United States Patent
Lee et al.

(10) Patent No.: US 10,191,883 B2
(45) Date of Patent: Jan. 29, 2019

(54) INTER-INTEGRATED CIRCUIT BUS ARBITRATION SYSTEM CAPABLE OF AVOIDING HOST CONFLICT

(71) Applicants: Inventec (Pudong) Technology Corp., Shanghai (CN); Inventec Corporation, Taipei (TW)

(72) Inventors: Tsung-Hsi Lee, Taipei (TW); Wei-Liang Chen, Taipei (TW)

(73) Assignees: Inventec (Pudong) Technology Corp., Shanghai (CN); Inventec Corporation, Taipei (TW)

( * ) Notice: Subject to any disclaimer, the term of this patent is extended or adjusted under 35 U.S.C. 154(b) by 22 days.

(21) Appl. No.: 15/466,823

(22) Filed: Mar. 22, 2017

(65) Prior Publication Data

US 2018/0137079 A1    May 17, 2018

(30) Foreign Application Priority Data

Nov. 17, 2016    (CN) .......................... 2016 1 1019036

(51) Int. Cl.
*G06F 13/42* (2006.01)
*G06F 13/368* (2006.01)
*G06F 13/40* (2006.01)

(52) U.S. Cl.
CPC ........ *G06F 13/4282* (2013.01); *G06F 13/368* (2013.01); *G06F 13/4022* (2013.01); *G06F 13/4068* (2013.01); *G06F 2213/0016* (2013.01)

(58) Field of Classification Search
CPC ............... G06F 13/4282; G06F 13/368; G06F 13/4022; G06F 13/4068
USPC ........................................................ 710/105
See application file for complete search history.

(56) References Cited

U.S. PATENT DOCUMENTS 9,798,686 B2 * 10/2017 Gately .................. G06F 13/364

OTHER PUBLICATIONS

"I2C-bus specification and user manual", Apr. 4, 2014, Rev. 6, pp. 1-64 (Year: 2014).*

* cited by examiner

*Primary Examiner* — Chun Kuan Lee
(74) *Attorney, Agent, or Firm* — Winston Hsu

(57) ABSTRACT

An inter-integrated circuit bus arbitration system includes a first master circuit, a second master circuit, an analog switch circuit, an initial state identification circuit, and a selection control circuit. When the first master circuit is initiated to transmit data, the initial state identification circuit generates a first initial pulse signal. When the second master circuit is initiated to transmit data, the initial state identification circuit generates a second initial pulse signal. If the first initial pulse signal leads the second initial pulse signal, the selection control circuit generates a first control signal to make the analog switch circuit establish electrical connections between the first master circuit and an external data line and an external clock line when receiving the first control signal.

16 Claims, 4 Drawing Sheets

INTER-INTEGRATED CIRCUIT BUS ARBITRATION SYSTEM CAPABLE OF AVOIDING HOST CONFLICT

BACKGROUND OF THE INVENTION

1. Field of the Invention

The present invention relates to an inter-integrated circuit bus arbitration system, especially relates to an inter-integrated circuit bus arbitration system that is capable of avoiding the master circuits from occupying the inter-integrated circuit bus in the same time.

2. Description of the Prior Art

Inter-Integrated circuit (I2C) bus is used to transmit messages between integrated circuits with one data line and one clock signal line. For example, the master device can use the clock signal line and the data line to transmit the clock signal and the data. The slave device can identify the data signal according to the clock signal so that the slave device can further execute the instructions issued by the master device, such as read instructions and write instructions. The I2C bus is widely used on integrated circuit design due to its simple implementation.

In practice, different master devices may have to access the same slave device. For example, in a sensor system, different processors may have to access the same sensor to derive the value detected by the sensor for corresponding analysis or processing. Generally, to simplify routing, the slave device may only include one set of I2C bus. Therefore, all different master devices have to be connected to the same I2C bus. In this case, to avoid the master devices from issuing requests to the slave device in the same time, which causes the slave device fail to identify instructions, some of the master devices may include detection mechanism to detect whether the I2C bus is occupied by other master devices before issuing requests. However, it is difficult to guaranteed that all the master devices connected the I2C bus include the detection mechanism. Therefore, simply relying on the detection mechanism of the master devices is not able to prevent the confliction between the master devices connected to the same slave device completely.

SUMMARY OF THE INVENTION

One embodiment of the present invention discloses an inter-integrated circuit bus arbitration system. The inter-integrated circuit bus arbitration system includes a first master circuit, a second master circuit, an analog switch circuit, an initial state identification circuit, and a selection control circuit.

The first master circuit has a first clock line and a first data line. The first master circuit controls voltages of the first clock line and the first data line according to data to be transmitted. The second master circuit has a second clock line and a second data line. The second master circuit controls voltages of the second clock line and the second data line according to the data to be transmitted. The analog switch circuit is coupled to the first master circuit, the second master circuit, an external clock line and an external data line. The analog switch circuit establishes an electrical connection between the first clock line and the external clock line and an electrical connection between the first data line and the external data line when receiving a first control signal, and establishes an electrical connection between the second clock line and the external clock line and an electrical connection between the second data line and the external data line when receiving a second control signal.

The initial state identification circuit is coupled to the first master circuit and the second master circuit. The initial state identification circuit generates a first initial pulse signal when the first data line changes from a high voltage level to a low voltage level and the first clock line of the first master circuit is kept at the high voltage level, and generates a second initial pulse signal when the second data line changes from the high voltage level to the low voltage level and the second clock line is kept at the high voltage level. The selection control circuit is coupled to the initial state identification circuit. The selection control circuit generates the first control signal when the first initial pulse signal leads the second initial pulse signal, and generates the second control signal when the second initial pulse signal leads the first initial pulse signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
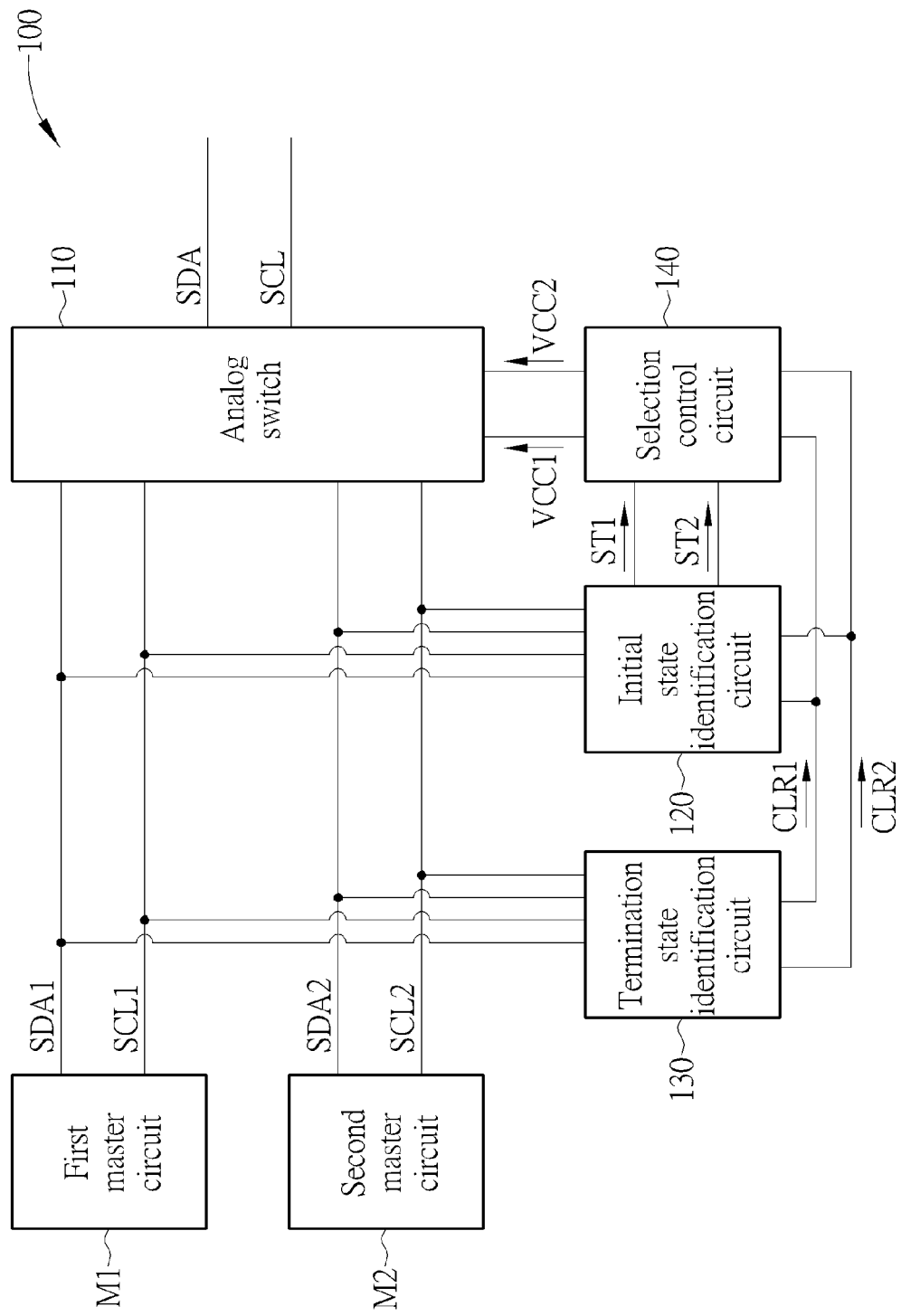
FIG. 1 shows an inter-integrated circuit bus arbitration system according to one embodiment of the present invention.

FIG. 1 shows an inter-integrated circuit bus arbitration system 100 according to one embodiment of the present invention. The inter-integrated circuit bus arbitration system. 100 includes a first master circuit M1, a second master circuit M2, an analog switch 110, an initial state identification circuit 120, a termination state identification circuit 130, and a selection control circuit 140.

The first master circuit M1 has a first clock line SCL1 and a first data line SDA1. The first master circuit M1 can transmit data by controlling voltages of the first clock line SCL1 and the first data line SDA1, that is, the first master circuit M1 can transmit the clock signal through the first clock line SCL1 and transmit the data through the first data line SDA1. Similarly, the second master circuit M2 has a second clock line SCL2 and a second data line SDA2. The second master circuit M2 can transmit data by controlling voltages of the second clock line SCL2 and the second data line SDA2.

The analog switch circuit 110 is coupled to the first master circuit M1, the second master circuit M2, an external clock line SCL and an external data line SDA. The external clock line SCL and the external data line SDA can be coupled to the external slave device. When the analog switch receives a first control signal VCC1, the analog switch circuit 110 can establish an electrical connection between the first clock line SCL1 and the external clock line SCL and an electrical connection between the first data line SDA1 and the external data line SDA. In this case, the first master circuit M1 is able to control the external clock line SCL and the external data line SDA to command the external slave device to perform the corresponding operations. Also, when the analog switch receives a second control signal VCC2, the analog switch circuit 110 can establish an electrical connection between the second clock line SCL2 and the external clock line SCL and an electrical connection between the second data line SDA2 and the external data line SDA. In this case, the second master circuit M2 is able to control the external clock line SCL and the external data line SDA to command the external slave device to perform corresponding operations.

The initial state identification circuit 120 is coupled to the first master circuit M1 and the second master circuit M2. According to the protocol of the I2C bus, when the first master circuit M1 prepares to command the slave device to execute the corresponding operations, the first master circuit M1 will change the voltage level of the first data line SDA1 from a high voltage level to a low voltage level and keep the first clock line SCL1 to be at the high voltage level. Therefore, when the initial state identification circuit 120 detects that the first data line SDA1 changes from the high voltage level to the low voltage level while the first clock line SCL1 is kept at the high voltage level, the initial state identification circuit 120 will generate a first initial pulse signal ST1, indicating that the first master circuit M1 is preparing to control the I2C bus. Similarly, when the initial state identification circuit 120 detects that the second data line SDA2 changes from the high voltage level to the low voltage level while the second clock line SCL2 is kept at the high voltage level, the initial state identification circuit 120 will generate a second initial pulse signal ST2, indicating that the second master circuit M2 is preparing to control the I2C bus.

The selection control circuit 140 is coupled to the initial state identification circuit 120. When the selection control circuit 140 detects that the first initial pulse signal ST1 leads the second initial pulse signal ST2, that is, if the second initial pulse signal ST2 is generated after the first initial pulse signal ST1 or the second initial pulse signal ST2 is not generated after the first initial pulse signal is generated, in either situations, the selection control circuit 140 will generate the first control signal VCC1. In this case, the analog switch circuit 110 will establish an electrical connection between the first clock line SCL1 and the external clock line SCL and an electrical connection between the first data line SDL1 and the external data line SDL. Therefore, the first master circuit M1 would be able to control the external clock line SCL and the external data line SDA.

In contrary, if the second initial pulse signal ST2 leads the first initial pulse signal ST1, the selection control circuit 140 will generate the second control signal VCC2. In this case, the analog switch circuit 110 will establish an electrical connection between the second clock line SCL2 and the external clock line SCL and an electrical connection between the second data line SDA2 and the external data line SDA. Therefore, the second master circuit M2 would be able to control the external clock line SCL and the external data line SDA.

Figure 2:
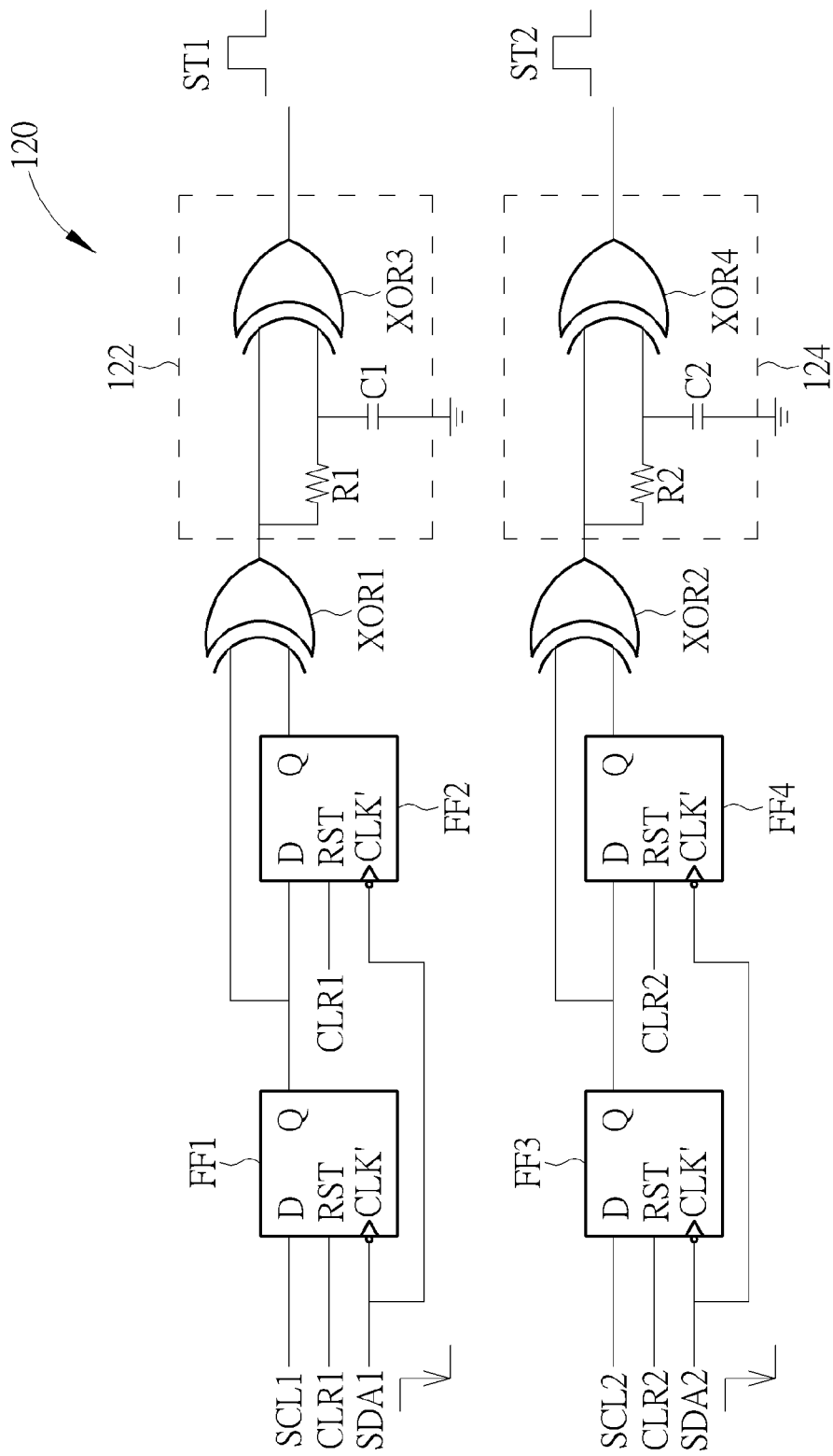
FIG. 2 shows an initial state identification circuit according to one embodiment of the present invention.

FIG. 2 shows the initial state identification circuit 120 according to one embodiment of the present invention. The initial state identification circuit 120 includes a first D flip-flop FF1, a second D flip-flop FF2, a first exclusive OR gate XOR1, a first pulse generator 122, a third D flip-flop FF3, a fourth D flip-flop FF4, a second exclusive OR gate XOR2, and a second pulse generator 124.

The first D flip-flop FF1 has a data terminal D coupled to the first clock line SCL1, a falling edge clock terminal CLK' coupled to the first data line SDA1, and an output terminal Q. The second D flip-flop FF2 has a data terminal D coupled to the output terminal Q of the first D flip-flop FF1, a falling edge clock terminal CLK' coupled to the first data line SDA1, and an output terminal Q. The first exclusive OR gate XOR1 has a first input terminal coupled to the output terminal Q of the first D flip-flop FF1, a second input terminal coupled to the output terminal Q of the second D flip-flop FF2, and an output terminal. The first pulse generator 122 can generate the first initial pulse signal ST1 according to a voltage of the output terminal of the first exclusive OR gate XOR1.

The first pulse generator 122 includes a first resistor R1, a first capacitor C1, and a third exclusive OR gate XOR3. The first resistor R1 has a first terminal coupled to the output terminal of the first exclusive OR gate XOR1, and a second terminal. The first capacitor C1 has a first terminal coupled to the second terminal of the first resistor R1, and a second terminal coupled to a ground GND. The third exclusive OR gate XOR3 has a first input terminal coupled to the output terminal of the first exclusive OR gate XOR1, a second input terminal coupled to the second terminal of the first resistor R1, and an output terminal for outputting the first initial pulse signal ST1.

In FIG. 2, in the initial state, the output terminal Q of the first D flip-flop FF1 and the output terminal Q of the second D flip-flop FF2 are both at a low voltage level (or logic '0'). In this case, the output terminals of the first exclusive OR gate XOR1 and the third exclusive OR gate XOR3 are both at the low voltage (or logic '0').

When the master circuit M1 changes the voltage of the first data line SDA1 from the high voltage level to the low voltage level while voltage of the first clock line SCL1 is kept at the high voltage level, the transition of the voltage of the first data line SDA1 will trigger the falling edge clock terminal CLK' of the first D flip-flop FF1 and the falling edge clock terminal CLK' of the second D flip-flip FF2. Therefore, the output terminal Q of the first D flip-flop FF1 will output the high voltage level according to the first clock line SCL1, and the output terminal of the second D flip-flop FF2 will output the low voltage level according to the previous voltage of the output terminal Q of the first D flip-flop FF1. Consequently, the first exclusive OR gate XOR1 will receive different voltage levels from the two input terminals, output the high voltage level (or logic '1'), and start to charge the first capacitor C1. When the voltage of the first capacitor C1 is charged to be higher than a threshold value, the voltage of the output terminal of the third exclusive OR gate XOR3 will change from the high voltage level (logic '1') to low voltage level (logic '0'). That is, after receiving the high voltage level outputted from the first exclusive OR gate XOR1, the first pulse generator 122 will generate the first initial pulse signal ST1 accordingly. In some embodiments, by selecting the capacitance value of the first capacitor C1 and the resistance value of the first resistor R1 properly, the charging speed of the first capacitor C1 will be adjusted, thereby changing the pulse length of the first initial pulse signal ST1.

Similarly, the second pulse generator 124 includes a second resistor R2, a second capacitor C2, and a fourth exclusive OR gate XOR4. The second resistor R2, the second capacitor C2, and the fourth exclusive OR gate XOR4 can be operated in the same manner as the first resistor R1, the first capacitor C1, and the third exclusive OR gate XOR3. The third D flip-flop FF3, the fourth D flip-flop FF4, the second exclusive OR gate XOR2, and the second pulse generator 124 can be operated in the same manner as the first D flip-flop FF1, the second D flip-flop FF2, the first exclusive OR gate XOR1, and the first pulse generator 122. Therefore, when the second master circuit M2 changes the voltage of the second data line SDA2 from the high voltage level to the low voltage level while the voltage of the second clock line SCL2 is kept at the high voltage level, the initial state identification circuit 120 will generate the second initial pulse signal ST2.

Figure 3:
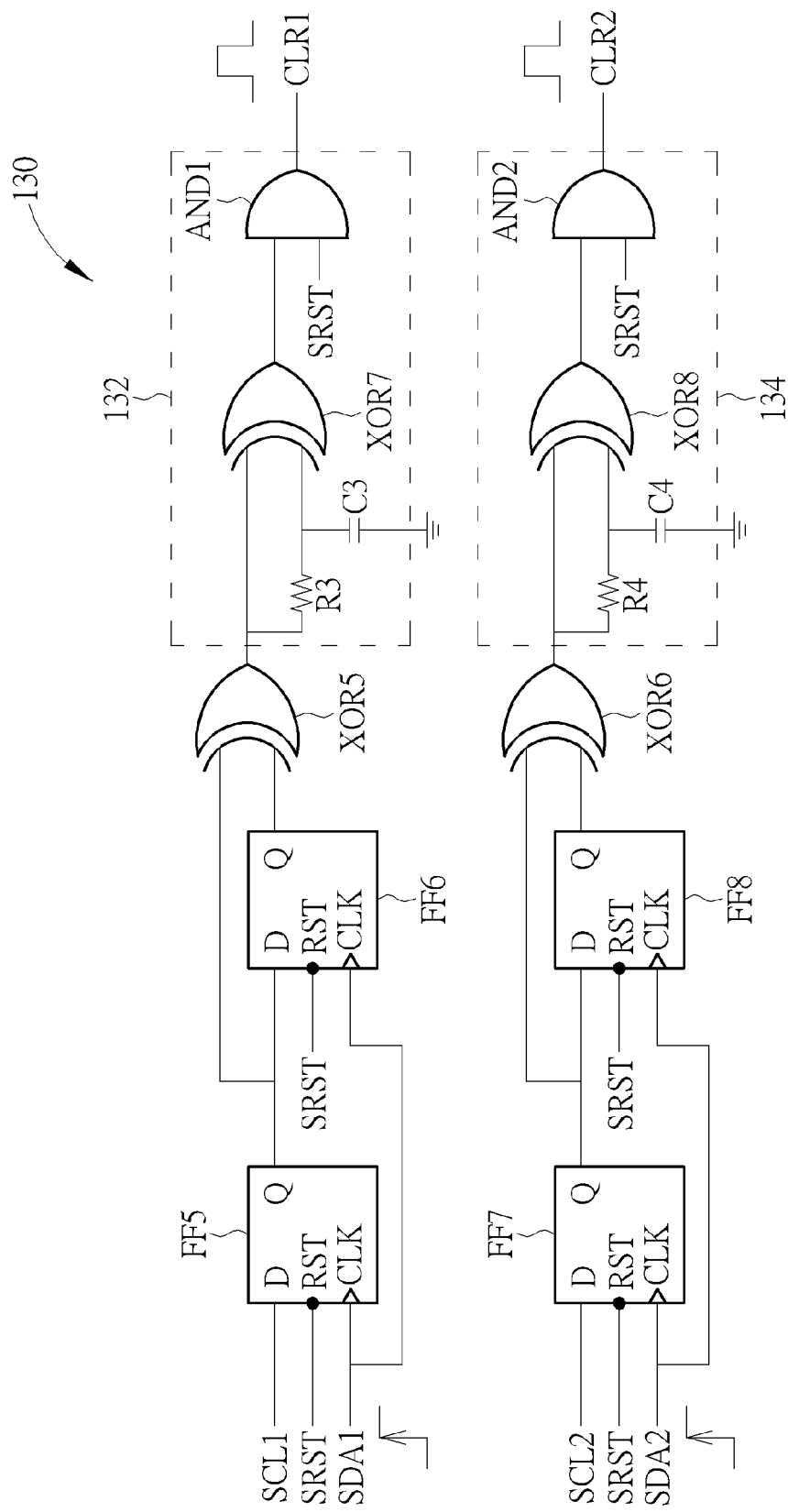
FIG. 3 shows a termination state identification circuit according to one embodiment of the present invention.

In some embodiments, to allow other master circuits to control the I2C bus after the dominating master circuit finishes commanding the slave device to perform the corresponding operations, the inter-integrated circuit bus arbitration system 100 can adopt the termination state identification circuit 130 to detect whether the dominating master circuit has finished its operations, and further generate a termination pulse signal to reset the D flip-flops in the initial state identification circuit 120. FIG. 3 shows the termination state identification circuit 130 according to one embodiment of the present invention.

The termination state identification circuit 130 is coupled to the first master circuit M1 and the second master circuit M3. According to the communication protocol of the I2C bus, when the voltage of the first data line SDA1 changes from the low voltage level to the high voltage level while the first clock line is kept at the high voltage, it means that the first master circuit M1 is about to finish its control for the slave device. In this case, the termination state identification circuit 130 will generate the first termination pulse signal CLR1. In the embodiment shown in FIG. 2, the first D flip-flop FF1 also includes a reset terminal RST. The reset terminal RST can receive the first termination pulse signal CLR1 and reset the first D flip-flop FF1 according to the first termination pulse signal CLR1 so that the output terminal Q of the first D flip-flop FF1 would change to the low voltage level (logic '0'). In addition, the second D flip-flop FF2 can also include a reset terminal RST, and the reset terminal RST can receive the first termination pulse signal CLR1 for resetting the second D flip-flop FF2.

Similarly, when the voltage of the second data line SDA2 changes from the low voltage level to the high voltage level while the voltage of the second clock line SCL2 is kept at the high voltage level, it means that second master circuit M2 is about to finish its control to the slave device. In this case, the termination state identification circuit 130 will generate the second termination pulse signal CLR2. In the embodiment shown in FIG. 2, the third D flip-flop FF3 further includes a reset terminal RST, and the reset terminal RST of the third D flip-flop FF3 can receive the second termination pulse signal CLR2 and reset the third D flip-flop FF3 according to the second terminal pulse signal CLR2, changing the voltage of the output terminal Q of the third D flip-flop FF3 to the low voltage level (logic '0'). In addition, the fourth D flip-flop FF4 also includes a reset terminal RST. The reset terminal RST of the fourth D flip-flop FF4 can receive the second termination pulse signal CLR2 and reset the fourth D flip-flop FF4 according to the second terminal pulse signal CLR2.

In FIG. 3, the termination state identification circuit 130 includes a fifth D flip-flop FF5, the sixth D flip-flop FF6, the fifth exclusive OR gate XOR5, the third pulse generator 132, the seventh D flip-flop FF7, the eighth D flip-flop FF8, the sixth exclusive OR gate XOR6, and the fourth pulse generator 134.

The fifth D flip-flop FF5 has a data terminal D coupled to the first clock line SCL1, a rising edge clock terminal CLK coupled to the first data line SDA1, and an output terminal Q. The sixth D flip-flop FF6 has a data terminal D coupled to the output terminal Q of the fifth D flip-flop FF5, a rising edge clock terminal CLK coupled to the first data line SDA1, and an output terminal Q. The fifth exclusive OR gate XOR5 has a first input terminal coupled to the output terminal Q of the fifth D flip-flop FF5, a second input terminal coupled to the output terminal Q of the sixth D flip-flop FF6, and an output terminal. The third pulse generator 132 can generate the first termination pulse signal CLR1 according to a voltage of the output terminal of the fifth exclusive OR gate XOR5.

Namely, the fifth D flip-flop FF5, the sixth D flip-flop FF6, the fifth exclusive OR gate XOR5, the third pulse generator 132 can be operated in a similar manner to the first D flip-flop FF1, the second D flip-flop FF2, the first exclusive OR gate XOR1, and the first pulse generator 122. The main difference between these two state identification circuits is in that the clock terminals CLK of the fifth D flip-flop FF5 and the sixth D flip-flop FF6 are triggered by rising edges for complying with the termination condition defined by the protocol of I2C bus while the clock terminals CLK' of the first D flip-flop FF1 and the second D flip-flop FF2 are triggered by falling edges for complying with the initialization condition defined by the protocol of I2C bus. Consequently, the termination state identification circuit 130 can generate the first termination pulse signal CLR1 when the voltage of the first data line SDA1 changes from the low voltage level to the high voltage level while the first clock line SCL1 is kept at the high voltage level.

Similarly, the seventh D flip-flop FF7, the eighth D flip-flop FF8, the sixth exclusive OR gate XOR6, and the fourth pulse generator 134 can be operated in the same manner as the fifth D flip-flop FF5, the sixth D flip-flop FF6, the fifth exclusive OR gate XOR5, and the third pulse generator 132. Therefore, the termination state identification circuit 130 can generate the second termination pulse signal CLR2 when the voltage of the second data line SDA2 changes from the low voltage level to the high voltage level while the second clock line SCL2 is kept at the high voltage level.

In addition, in FIG. 3, the third pulse generator 132 includes a third resistor R3, a third capacitor C3, a seventh exclusive OR gate XOR7, and a first AND gate AND1. The third resistor R3 has a first terminal coupled to the output terminal of the fifth exclusive OR gate XOR5, and a second terminal. The third capacitor C3 has a first terminal coupled to the second terminal of the third resistor R3, and a second terminal coupled to a ground GND. The seventh exclusive OR gate XOR7 has a first input terminal coupled to the output terminal of the fifth exclusive OR gate XOR5, a second input terminal coupled to the second terminal of the third resistor R3, and an output terminal. The first AND gate AND1 has a first input terminal coupled to the output terminal of the seventh exclusive OR gate XOR7, a second input terminal for receiving the system reset signal SRST, and an output terminal for outputting the first termination pulse signal CLR1.

That is, after the third pulse generator 132 receives the high voltage level outputted from the fifth exclusive OR gate XOR5, the two input terminals of the seventh exclusive OR gate XOR7 will be at different voltage levels. Therefore, the voltage of the output terminal of the seventh exclusive OR gate XOR7 will change to the high voltage level first, and then the voltage of the output terminal of the seventh exclusive OR gate XOR7 will change back to the low voltage level once the third capacitor C3 is charged to the high voltage level, thereby generating the first termination pulse signal CLR1. In addition, in FIG. 3, the first termination pulse signal CLR1 is generated after the logic computation executed by the first AND gate AND1 and the reset signal SRST. Namely, the termination state identification circuit 130 will output the first termination pulse signal CLR1 only when the reset signal SRST is at the high voltage level (logic '1'), that is, only when the system is not being reset. If the reset signal SRST is at the low voltage level (logic '0'), which means that the inter-integrated circuit bus arbitration system 100 is to be reset, then the reset terminals RST of the fifth D flip-flop FF5, the sixth D flip-flop FF6, the seventh D flip-flop FF7, and the eighth D flip-flop FF8 will receive the reset signal SRST, thereby resetting the fifth D flip-flop FF5, the sixth D flip-flop FF6, the seventh D flip-flop FF7, and the eighth D flip-flop FF8.

Similarly, in FIG. 3, the fourth pulse generator 134 includes a fourth resistor R4, a fourth capacitor C4, an eighth exclusive OR gate XOR8, and the second AND gate AND2, and the fourth pulse generator 134 can be operated in the same manner as the third pulse generator 132. Therefore, when the voltage of the second data line SDA2 changes from the low voltage level to the high voltage level while the second clock line SCL2 is kept at the high voltage level, the fourth pulse generator 134 will generate the second termination pulse signal CLR2.

Figure 4:
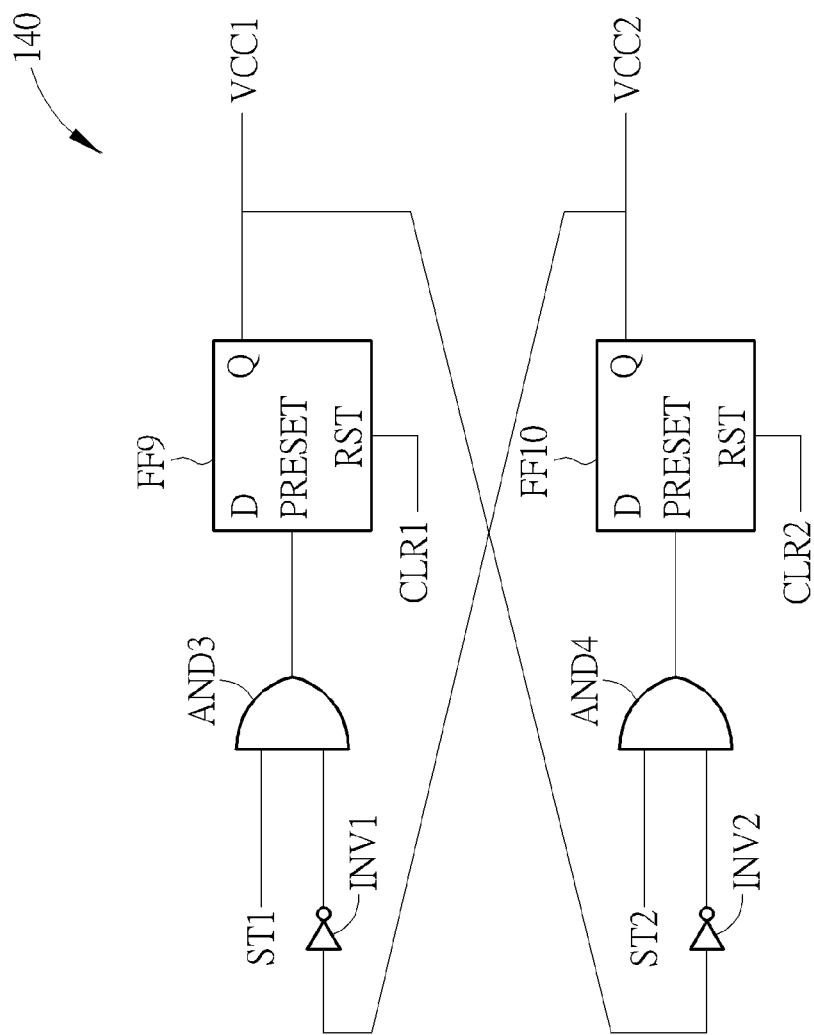
FIG. 4 shows a selection control circuit according to one embodiment of the present invention.

FIG. 4 shows a selection control circuit 140 according to one embodiment of the present invention. The selection control circuit 140 includes a first inverter INV1, a second inverter INV2, a third AND gate AND3, a ninth D flip-flop FF9, a fourth AND gate AND4, and a tenth D flip-flop FF10. The first inverter INV1 has an input terminal and an output terminal. The second inverter INV2 has an input terminal and an output terminal. The third AND gate AND3 has a first input terminal for receiving the first initial pulse signal ST1, a second input terminal coupled to the output terminal of the first inverter INV1, and an output terminal. The ninth D flip-flop FF9 has a preset terminal PRST coupled to the output terminal of the third AND gate AND3, an output terminal Q coupled to the input terminal of the second inverter INV2 and for outputting the first control signal VCC1. The fourth AND gate AND4 has a first input terminal for receiving the second initial pulse signal ST2, a second input terminal coupled to the output terminal of the second inverter INV2, and an output terminal. The tenth D flip-flop has a preset terminal PRST coupled to the output terminal of the fourth AND gate AND4, and an output terminal Q coupled to the input terminal of the first inverter INV1 and for outputting the second control signal VCC2.

In the initial state of the inter-integrated circuit bus arbitration system 100, since the first control signal VCC1 and the second control signal VCC2 are at the low voltage level (logic '0'), the second input terminal of the third AND gate AND3 would be at the high voltage level. When the selection control circuit 140 receives the first initial pulse signal ST1, the voltage of the first input terminal of the third AND gate AND3 would change to the high voltage level, making the voltage of the output terminal of the third AND gate AND3 to be at the high voltage level (logic '1'). Meanwhile, the ninth D flip-flop FF9 will be preset to output the high voltage level. Therefore, the selection control circuit 140 can output the first control signal VCC1. In this case, the second input terminal of the fourth AND gate AND4 will be kept at the low voltage level by the second inverter INV2. Therefore, even if the selection control circuit 140 receives the second initial pulse signal ST2 later on, the selection control circuit 140 will not generate the second control signal VCC2.

In the contrary, if the selection control circuit 140 receives the second initial pulse signal ST2 first, then the second input terminal of the third AND gate AND3 will be kept at the low voltage. Therefore, even if the selection control circuit 140 receives the first initial pulse signal ST1 later on, the selection control circuit 140 will not generate the first control signal VCC1.

Consequently, the inter-integrated circuit bus arbitration system 100 can efficiently assign the I2C bus to the master circuit which sends the controlling request first without causing conflict between different master circuits.

Furthermore, in FIG. 4, the ninth D flip-flop FF9 and the tenth D flip-flop FF10 can further include reset terminals RST. The reset terminal RST of the ninth D flip-flop FF9 can receive the first termination pulse signal CLR1, and the reset terminal of the tenth D flip-flop FF10 can receive the second termination pulse signal CLR2. Consequently, when the termination state identification circuit 130 detects the first master circuit M1 or the second master circuit M2 is about to finish commanding the slave device for corresponding operations, the termination state identification circuit 130 may reset the ninth D flip-flop FF9 and the tenth D flip-flop FF10 according to the first termination pulse signal CLR1 and the second termination pulse signal CLR2, recovering the selection control circuit 140 back to its initial state for the next identification.

In some embodiments of the present invention, the inter-integrated circuit bus arbitration system. 100 can support more than two master circuits. For example, the initial state identification circuit 120 can use the structure shown in FIG. 2 to identify the operation of each of the master circuits and generate the initial pulse signal and the termination pulse signal accordingly. In the selection control circuit 140, the number of input terminals of the AND gate can be adjusted according to the number of master circuits supported, for example, the AND gate may have four input terminals. In this case, if one master circuit of the four master circuits issues a controlling request first, the selection control circuit 140 will generate the corresponding control signal accordingly. Also, according to the structure shown in FIG. 4, the control signal will prevent the selection control circuit 140 from generating other control signals. Consequently, the other three master circuits will not be able to control the I2C bus in the same time.

In summary, the inter-integrated circuit bus arbitration system provided by the embodiments of the present invention can implement arbitration among different master circuits efficiently. Therefore, the master circuit issuing the request for controlling the I2C bus first will be able to dominate the control of the I2C bus, and the master circuits issuing the requests for controlling the I2C bus later on will not be able to use the I2C bus, thereby avoiding the conflict between different master circuits. Also, the inter-integrated circuit bus arbitration system provided by the embodiments of the present invention can be implemented by simple elements without complicate software controls. Therefore, the system design can be simplified while the hardware overhead is minimized.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An inter-integrated circuit bus arbitration system comprising:

a first master circuit having a first clock line and a first data line, and configured to control voltages of the first clock line and the first data line according to data to be transmitted;

a second master circuit having a second clock line and a second data line, and configured to control voltages of the second clock line and the second data line according to the data to be transmitted;

an analog switch circuit coupled to the first master circuit, the second master circuit, an external clock line and an external data line, and configured to establish an electrical connection between the first clock line and the external clock line and an electrical connection between the first data line and the external data line when receiving a first control signal, and establish an electrical connection between the second clock line and the external clock line and an electrical connection between the second data line and the external data line when receiving a second control signal;

an initial state identification circuit, coupled to the first master circuit and the second master circuit, and configured to generate a first initial pulse signal when the first data line changes from a high voltage level to a low voltage level and the first clock line of the first master circuit is kept at the high voltage level, and generate a second initial pulse signal when the second data line changes from the high voltage level to the low voltage level and the second clock line is kept at the high voltage level, the initial state identification circuit comprising:

a first D flip-flop having a data terminal coupled to the first clock line, a falling edge clock terminal coupled to the first data line, and an output terminal;

a second D flip-flop having a data terminal coupled to the output terminal of the first D flip-flop, a falling edge clock terminal coupled to the first data line, and an output terminal;

a first exclusive OR gate having a first input terminal coupled to the output terminal of the first D flip-flop, a second input terminal coupled to the output terminal of the second D flip-flop, and an output terminal;

a first pulse generator configured to generate the first initial pulse signal according to a voltage of the output terminal of the first exclusive OR gate;

a third D flip-flop having a data terminal coupled to the second clock line, a falling edge clock terminal coupled to the second data line, and an output terminal;

a fourth D flip-flop having a data terminal coupled to the output terminal of the third D flip-flop, a falling edge clock terminal coupled to the second data line, and an output terminal;

a second exclusive OR gate having a first input terminal coupled to the output terminal of the third D flip-flop, a second input terminal coupled to the output terminal of the fourth D flip-flop, and an output terminal; and a second pulse generator configured to generate the second initial pulse signal according to a voltage of the output terminal of the second exclusive OR gate; and a selection control circuit coupled to the initial state identification circuit, and configured to generate the first control signal when the first initial pulse signal leads the second initial pulse signal, and generate the second control signal when the second initial pulse signal leads the first initial pulse signal.

2. The inter-integrated circuit bus arbitration system of claim 1, wherein:

the first pulse generator comprises:

a first resistor having a first terminal coupled to the output terminal of the first exclusive OR gate, and a second terminal;

a first capacitor having a first terminal coupled to the second terminal of the first resistor, and a second terminal coupled to a ground; and a third exclusive OR gate having a first input terminal coupled to the output terminal of the first exclusive OR gate, a second input terminal coupled to the second terminal of the first resistor, and an output terminal configured to output the first initial pulse signal; and the second pulse generator comprises:

a second resistor having a first terminal coupled to the output terminal of the second exclusive OR gate, and a second terminal;

a second capacitor having a first terminal coupled to the second terminal of the second resistor, and a second terminal coupled to the ground; and a fourth exclusive OR gate having a first input terminal coupled to the output terminal of the second exclusive OR gate, a second input terminal coupled to the second terminal of the second resistor, and an output terminal configured to output the second initial pulse signal.

3. The inter-integrated circuit bus arbitration system of claim 1, further comprising a termination state identification circuit coupled to the first master circuit and the second master circuit, and configured to generate a first termination pulse signal when the first data line changes from the low voltage to the high voltage and the first clock line is kept at the high voltage, and generate the second termination pulse signal when the second clock line changes from the low voltage to the high voltage and the second data line is kept at the high voltage, wherein:

the first D flip-flop further comprises a reset terminal configured to receive the first termination pulse signal and reset the first D flip-flop according to the first terminal pulse signal;

the second D flip-flop further comprises a reset terminal configured to receive the first termination pulse signal and reset the second D flip-flop according to the first terminal pulse signal;

the third D flip-flop further comprises a reset terminal configured to receive the second termination pulse signal and reset the third D flip-flop according to the second terminal pulse signal; and the fourth D flip-flop further comprises a reset terminal configured to receive the second termination pulse signal and reset the fourth D flip-flop according to the second terminal pulse signal.

4. The inter-integrated circuit bus arbitration system of claim 3, wherein the termination state identification circuit comprises:

a fifth D flip-flop having a data terminal coupled to the first clock line, a rising edge clock terminal coupled to the first data line, and an output terminal;

a sixth D flip-flop having a data terminal coupled to the output terminal of the fifth D flip-flop, a rising edge clock terminal coupled to the first data line, and an output terminal;

a fifth exclusive OR gate having a first input terminal coupled to the output terminal of the fifth D flip-flop, a second input terminal coupled to the output terminal of the sixth D flip-flop, and an output terminal;
a third pulse generator configured to generate the first termination pulse signal according to a voltage of the output terminal of the fifth exclusive OR gate;
a seventh D flip-flop having a data terminal coupled to the second clock line, a rising edge clock terminal coupled to the second data line, and an output terminal;
an eighth D flip-flop having a data terminal coupled to the output terminal of the seventh D flip-flop, a rising edge clock terminal coupled to the second data line, and an output terminal;
a sixth exclusive OR gate having a first input terminal coupled to the output terminal of the seventh D flip-flop, a second input terminal coupled to the output terminal of the eighth D flip-flop, and an output terminal; and
a fourth pulse generator configured to generate the second termination pulse signal according to a voltage of the output terminal of the sixth exclusive OR gate.

5. The inter-integrated circuit bus arbitration system of claim 4, wherein:
the third pulse generator comprises:
a third resistor having a first terminal coupled to the output terminal of the fifth exclusive OR gate, and a second terminal;
a third capacitor having a first terminal coupled to the second terminal of the third resistor, and a second terminal coupled to a ground; and
a seventh exclusive OR gate having a first input terminal coupled to the output terminal of the fifth exclusive OR gate, a second input terminal coupled to the second terminal of the third resistor, and an output terminal; and
the fourth pulse generator comprises:
a fourth resistor having a first terminal coupled to the output terminal of the sixth exclusive OR gate, and a second terminal;
a fourth capacitor having a first terminal coupled to the second terminal of the fourth resistor, and a second terminal coupled to the ground; and
an eighth exclusive OR gate having a first input terminal coupled to the output terminal of the sixth exclusive OR gate, a second input terminal coupled to the second terminal of the fourth resistor, and an output terminal.

6. The inter-integrated circuit bus arbitration system of claim 5, wherein:
the third pulse generator further comprises a first AND gate having a first input terminal coupled to the output terminal of the seventh exclusive OR gate, a second input terminal configured to receive a system reset signal, and an output terminal configured to output the first termination pulse signal;
the fourth pulse generator further comprises a second AND gate having a first input terminal coupled to the output terminal of the eighth exclusive OR gate, a second input terminal configured to receive the system reset signal, and an output terminal configured to output the second termination pulse signal;
the fifth D flip-flop further comprises a reset terminal configured to receive the system reset signal and reset the fifth D flip-flop according to the system reset signal;
the sixth D flip-flop further comprises a reset terminal configured to receive the system reset signal and reset the sixth D flip-flop according to the system reset signal;
the seventh D flip-flop further comprises a reset terminal configured to receive the system reset signal and reset the seventh D flip-flop according to the system reset signal; and
the eighth D flip-flop further comprises a reset terminal configured to receive the system reset signal and reset the eighth D flip-flop according to the system reset signal.

7. The inter-integrated circuit bus arbitration system of claim 1, wherein the selection control circuit comprises:
a first inverter having an input terminal and an output terminal;
a second inverter having an input terminal and an output terminal;
a third AND gate having a first input terminal configured to receive the first initial pulse signal, a second input terminal coupled to the output terminal of the first inverter, and an output terminal;
a ninth D flip-flop having a preset terminal coupled to the output terminal of the third AND gate, an output terminal coupled to the input terminal of the second inverter and configured to output the first control signal;
a fourth AND gate having a first input terminal configured to receive the second initial pulse signal, a second input terminal coupled to the output terminal of the second inverter, and an output terminal; and
a tenth D flip-flop having a preset terminal coupled to the output terminal of the fourth AND gate, and an output terminal coupled to the input terminal of the first inverter and configured to output the second control signal.

8. The inter-integrated circuit bus arbitration system of claim 7, further comprising a termination state identification circuit coupled to the first master circuit and the second master circuit, and configured to generate a first termination pulse signal when the first data line changes from the low voltage to the high voltage and the first clock line is kept at the high voltage, and generate a second termination pulse signal when the second data line changes from the low voltage to the high voltage and the second clock line is kept at the high voltage, wherein:
the first D flip-flop further comprises a reset terminal configured to receive the first termination pulse signal and reset the first D flip-flop according to the first terminal pulse signal;
the second D flip-flop further comprises a reset terminal configured to receive the first termination pulse signal and reset the second D flip-flop according to the first terminal pulse signal;
the third D flip-flop further comprises a reset terminal configured to receive the second termination pulse signal and reset the third D flip-flop according to the second terminal pulse signal; and
the fourth D flip-flop further comprises a reset terminal configured to receive the second termination pulse signal and reset the fourth D flip-flop according to the second terminal pulse signal.

9. The inter-integrated circuit bus arbitration system of claim 8, wherein the termination state identification circuit comprises:
a fifth D flip-flop having a data terminal coupled to the first clock line, a rising edge clock terminal coupled to the first data line, and an output terminal;

a sixth D flip-flop having a data terminal coupled to the output terminal of the fifth D flip-flop, a rising edge clock terminal coupled to the first data line, and an output terminal;

a fifth exclusive OR gate having a first input terminal coupled to the output terminal of the fifth D flip-flop, a second input terminal coupled to the output terminal of the sixth D flip-flop, and an output terminal;

a third pulse generator configured to generate the first termination pulse signal according to a voltage of the output terminal of the fifth exclusive OR gate;

a seventh D flip-flop having a data terminal coupled to the second clock line, a rising edge clock terminal coupled to the second data line, and an output terminal;

an eighth D flip-flop having a data terminal coupled to the output terminal of the seventh D flip-flop, a rising edge clock terminal coupled to the second data line, and an output terminal;

a sixth exclusive OR gate having a first input terminal coupled to the output terminal of the seventh D flip-flop, a second input terminal coupled to the output terminal of the eighth D flip-flop, and an output terminal; and a fourth pulse generator configured to generate the second termination pulse signal according to a voltage of the output terminal of the sixth exclusive OR gate.

10. The inter-integrated circuit bus arbitration system of claim 1, further comprising a termination state identification circuit coupled to the first master circuit and the second master circuit, and configured to generate a first termination pulse signal when the first data line changes from the low voltage to the high voltage and the first clock line is kept at the high voltage, and generate the second termination pulse signal when the second clock line changes from the low voltage to the high voltage and the second data line is kept at the high voltage, wherein:

the first D flip-flop further comprises a reset terminal configured to receive the first termination pulse signal and reset the first D flip-flop according to the first terminal pulse signal;

the second D flip-flop further comprises a reset terminal configured to receive the first termination pulse signal and reset the second D flip-flop according to the first terminal pulse signal;

the third D flip-flop further comprises a reset terminal configured to receive the second termination pulse signal and reset the third D flip-flop according to the second terminal pulse signal; and the fourth D flip-flop further comprises a reset terminal configured to receive the second termination pulse signal and reset the fourth D flip-flop according to the second terminal pulse signal.

11. The inter-integrated circuit bus arbitration system of claim 10, wherein the termination state identification circuit comprises:

a fifth D flip-flop having a data terminal coupled to the first clock line, a rising edge clock terminal coupled to the first data line, and an output terminal;

a sixth D flip-flop having a data terminal coupled to the output terminal of the fifth D flip-flop, a rising edge clock terminal coupled to the first data line, and an output terminal;

a fifth exclusive OR gate having a first input terminal coupled to the output terminal of the fifth D flip-flop, a second input terminal coupled to the output terminal of the sixth D flip-flop, and an output terminal;

a third pulse generator configured to generate the first termination pulse signal according to a voltage of the output terminal of the fifth exclusive OR gate;

a seventh D flip-flop having a data terminal coupled to the second clock line, a rising edge clock terminal coupled to the second data line, and an output terminal;

an eighth D flip-flop having a data terminal coupled to the output terminal of the seventh D flip-flop, a rising edge clock terminal coupled to the second data line, and an output terminal;

a sixth exclusive OR gate having a first input terminal coupled to the output terminal of the seventh D flip-flop, a second input terminal coupled to the output terminal of the eighth D flip-flop, and an output terminal; and a fourth pulse generator configured to generate the second termination pulse signal according to a voltage of the output terminal of the sixth exclusive OR gate.

12. The inter-integrated circuit bus arbitration system of claim 11, wherein:

the third pulse generator comprises:
a third resistor having a first terminal coupled to the output terminal of the fifth exclusive OR gate, and a second terminal;
a third capacitor having a first terminal coupled to the second terminal of the third resistor, and a second terminal coupled to a ground; and
a seventh exclusive OR gate having a first input terminal coupled to the output terminal of the fifth exclusive OR gate, a second input terminal coupled to the second terminal of the third resistor, and an output terminal; and the fourth pulse generator comprises:
a fourth resistor having a first terminal coupled to the output terminal of the sixth exclusive OR gate, and a second terminal;
a fourth capacitor having a first terminal coupled to the second terminal of the fourth resistor, and a second terminal coupled to the ground; and
an eighth exclusive OR gate having a first input terminal coupled to the output terminal of the sixth exclusive OR gate, a second input terminal coupled to the second terminal of the fourth resistor, and an output terminal.

13. The inter-integrated circuit bus arbitration system of claim 12, wherein:

the third pulse generator further comprises a first AND gate having a first input terminal coupled to the output terminal of the seventh exclusive OR gate, a second input terminal configured to receive a system reset signal, and an output terminal configured to output the first termination pulse signal;

the fourth pulse generator further comprises a second AND gate having a first input terminal coupled to the output terminal of the eighth exclusive OR gate, a second input terminal configured to receive the system reset signal, and an output terminal configured to output the second termination pulse signal;

the fifth D flip-flop further comprises a reset terminal configured to receive the system reset signal and reset the fifth D flip-flop according to the system reset signal;

the sixth D flip-flop further comprises a reset terminal configured to receive the system reset signal and reset the sixth D flip-flop according to the system reset signal;

the seventh D flip-flop further comprises a reset terminal configured to receive the system reset signal and reset the seventh D flip-flop according to the system reset signal; and the eighth D flip-flop further comprises a reset terminal configured to receive the system reset signal and reset the eighth D flip-flop according to the system reset signal.

14. The inter-integrated circuit bus arbitration system of claim 13, wherein the selection control circuit comprises:
a first inverter having an input terminal and an output terminal;
a second inverter having an input terminal and an output terminal;
a third AND gate having a first input terminal configured to receive the first initial pulse signal, a second input terminal coupled to the output terminal of the first inverter, and an output terminal;
a ninth D flip-flop having a preset terminal coupled to the output terminal of the third AND gate, an output terminal coupled to the input terminal of the second inverter and configured to output the first control signal;
a fourth AND gate having a first input terminal configured to receive the second initial pulse signal, a second input terminal coupled to the output terminal of the second inverter, and an output terminal; and
a tenth D flip-flop having a preset terminal coupled to the output terminal of the fourth AND gate, and an output terminal coupled to the input terminal of the first inverter and configured to output the second control signal.

15. The inter-integrated circuit bus arbitration system of claim 1, further comprising a termination state identification circuit coupled to the first master circuit and the second master circuit, and configured to generate a first termination pulse signal when the first data line changes from the low voltage to the high voltage and the first clock line is kept at the high voltage, and generate a second termination pulse signal when the second data line changes from the low voltage to the high voltage and the second clock line is kept at the high voltage, wherein:
the first D flip-flop further comprises a reset terminal configured to receive the first termination pulse signal and reset the first D flip-flop according to the first terminal pulse signal;
the second D flip-flop further comprises a reset terminal configured to receive the first termination pulse signal and reset the second D flip-flop according to the first terminal pulse signal;
the third D flip-flop further comprises a reset terminal configured to receive the second termination pulse signal and reset the third D flip-flop according to the second terminal pulse signal; and
the fourth D flip-flop further comprises a reset terminal configured to receive the second termination pulse signal and reset the fourth D flip-flop according to the second terminal pulse signal.

16. The inter-integrated circuit bus arbitration system of claim 15, wherein the termination state identification circuit comprises:
a fifth D flip-flop having a data terminal coupled to the first clock line, a rising edge clock terminal coupled to the first data line, and an output terminal;
a sixth D flip-flop having a data terminal coupled to the output terminal of the fifth D flip-flop, a rising edge clock terminal coupled to the first data line, and an output terminal;
a fifth exclusive OR gate having a first input terminal coupled to the output terminal of the fifth D flip-flop, a second input terminal coupled to the output terminal of the sixth D flip-flop, and an output terminal;
a third pulse generator configured to generate the first termination pulse signal according to a voltage of the output terminal of the fifth exclusive OR gate;
a seventh D flip-flop having a data terminal coupled to the second clock line, a rising edge clock terminal coupled to the second data line, and an output terminal;
an eighth D flip-flop having a data terminal coupled to the output terminal of the seventh D flip-flop, a rising edge clock terminal coupled to the second data line, and an output terminal;
a sixth exclusive OR gate having a first input terminal coupled to the output terminal of the seventh D flip-flop, a second input terminal coupled to the output terminal of the eighth D flip-flop, and an output terminal; and
a fourth pulse generator configured to generate the second termination pulse signal according to a voltage of the output terminal of the sixth exclusive OR gate.

* * * * *